United States Patent [19]
Boles et al.

[11] Patent Number: 5,497,830
[45] Date of Patent: Mar. 12, 1996

[54] COATED BREAKER FOR CROSSLINKED ACID

[75] Inventors: Joel L. Boles, Spring; Arthur S. Metcalf, Tomball; Jeffrey C. Dawson, Spring, all of Tex.

[73] Assignee: BJ Services Company, Houston, Tex.

[21] Appl. No.: 418,332

[22] Filed: Apr. 6, 1995

[51] Int. Cl.⁶ .............................. E21B 43/26; E21B 43/27
[52] U.S. Cl. ................ 166/300; 166/307; 166/308; 507/204; 507/921; 507/923
[58] Field of Search ..................................... 166/300, 307, 166/308; 507/204, 921, 922, 923, 934

[56] References Cited

U.S. PATENT DOCUMENTS

| | | | |
|---|---|---|---|
| 3,779,915 | 12/1973 | Kucera | 166/308 X |
| 3,815,680 | 6/1974 | McGuire et al. | 166/308 X |
| 4,202,795 | 5/1980 | Burnham et al. | 166/308 X |
| 4,328,038 | 5/1982 | Briggs . | |
| 4,624,795 | 11/1986 | Dawson et al. | 166/307 X |
| 4,741,401 | 5/1988 | Walles et al. | 166/300 |
| 4,770,796 | 9/1988 | Jacobs | 166/307 X |
| 4,919,209 | 4/1990 | King | 166/300 |
| 5,102,558 | 4/1992 | McDougall et al. | 166/308 X |
| 5,102,559 | 4/1992 | McDougall et al. | 166/308 X |
| 5,110,486 | 5/1992 | Manalastas et al. | 166/308 X |
| 5,164,099 | 11/1992 | Gupta et al. | 166/300 |
| 5,370,184 | 12/1994 | McDougall et al. | 166/278 |

*Primary Examiner*—George A. Suchfield
*Attorney, Agent, or Firm*—Charles D. Gunter, Jr.; Grady K. Bergen

[57] ABSTRACT

A particulate gel breaker for the controlled reduction in viscosity of aqueous acid compositions used in fracture acidizing of subterranean formations, such as in oil and gas wells, is formed for use with crosslinked polymer gels which are crosslinked with organometallic compounds, such as titanium or zirconium. The gel breaker is composed of particles containing complexing materials such as fluoride, phosphate, sulfate anions and multi-carboxylated compounds, which are capable of complexing with the organometallic crosslinking compounds of the gel. The particles are coated with a water insoluble wood resin coating which reduces the rate of release of the complexing materials of the particles so that the viscosity of the gel is reduced at a retarded rate. The gel can thus be introduced into the well at a sufficiently high viscosity for fracturing and to allow time for the acid to penetrate the formation before the acid is released.

10 Claims, 1 Drawing Sheet

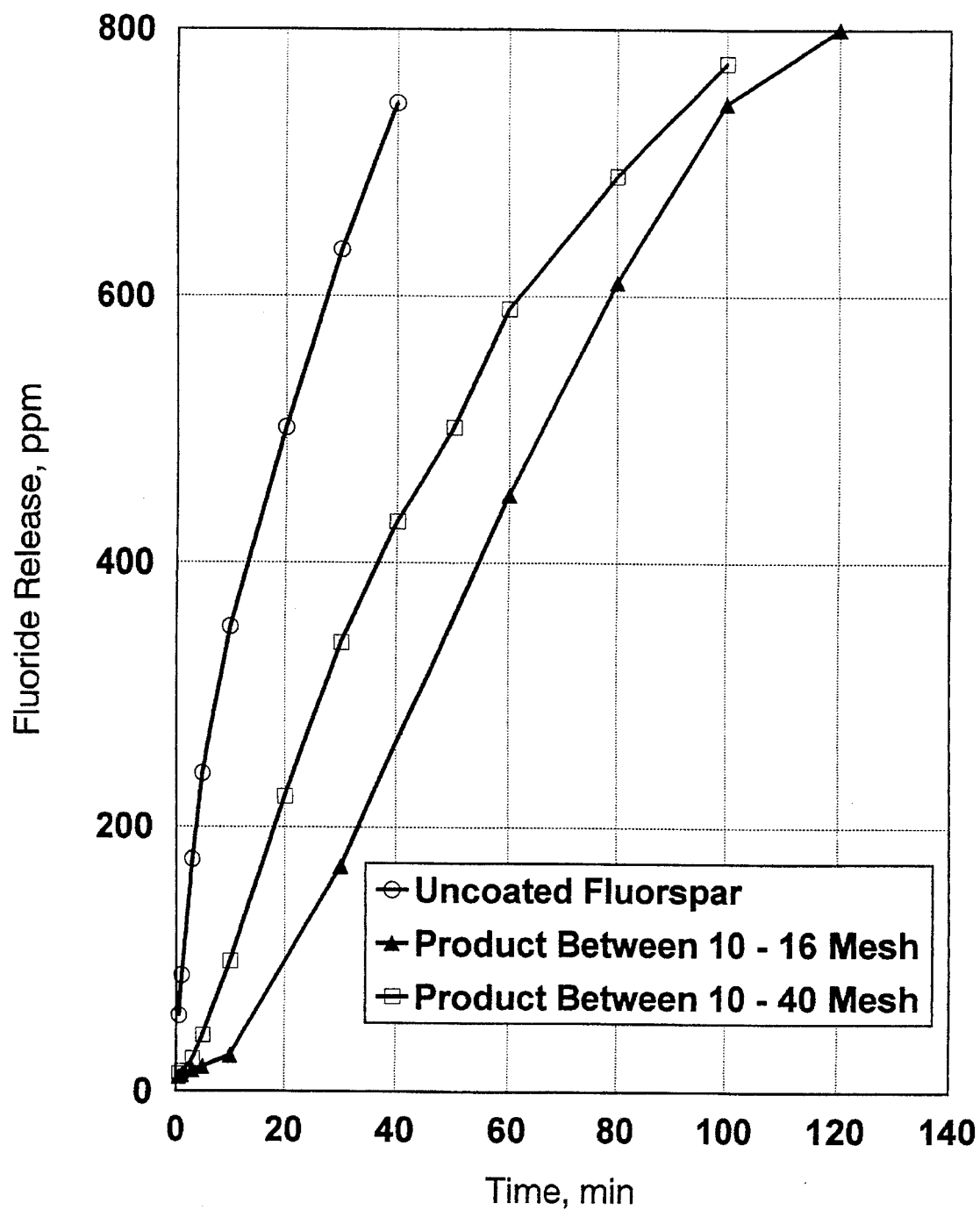

COATED BREAKER FOR CROSSLINKED ACID

BACKGROUND OF THE INVENTION

1. Field of the Invention

This invention relates to a coated breaker for use with acid fracturing gels used in treating subterranean formations.

2. Description of the Prior Art

Subterranean formations of oil and gas wells are often treated by hydraulically fracturing the formations to increase production of the oil or gas therein. Fracturing of these formations is accomplished by pumping fluids into the bore holes of the oil or gas wells under high pressure so that cracks or fissures are opened in the surrounding formation. Typically, the fracturing fluid is a polymer which has been gelled to increase its viscosity. The fluid's viscosity is proportionally related to the created fracture geometry and fracture width so that the more viscous fluids will produce longer and wider fractures. After the fracturing fluid is injected into the formation to produce the fracture, the viscosity of the fluid is reduced by means of "gel breakers" which break down the gelled fluid so that it can be easily pumped and removed from the well.

In certain formations, aqueous acid solutions can be used to improve the permeability of the formation thereby increasing production. These acids are often combined with the polymer gels used in fracturing to provide an acid fracturing fluid. One of the benefits of combining the aqueous acid solutions with gelled fracturing fluids is that the gelled fluid inhibits or retards the reaction of the acid with the formation. This is beneficial in that the acid would otherwise react too quickly, depleting the acid with very little penetration of the formation. Once in place, the viscosity of the fluid is reduced so that the acid is released to react, thus dissolving the faces of the newly formed fractures and improving the permeability of the producing strata.

Crosslinked polymer gels have been particularly useful with these aqueous acid solutions. The crosslinked gels are able to withstand the high temperature conditions commonly found in deeper oil and gas wells with little reduction in viscosity. The crosslinked polymer gels also exhibit an improved ability in reducing the reaction rate of the acid solution. Organometallic compounds are often used as a crosslinking agent in these polymer gels. It has been found that gels crosslinked with zirconium and titanium compounds can be treated with certain gel breaking substances, such as fluoride, phosphate or sulphate anions, to break the linkages of the crosslinked polymer fluid, thus reducing the viscosity of the gel.

Due to the depth of most wells, gel breakers dispersed within these crosslinked fluids prior to pumping would react too quickly, causing the fluid to degrade before placement of the fluid within the producing area of the formation. As a result, gel breakers have been added after the fluid is in place. This, however, requires additional time and labor. It is also difficult to ensure that the subsequently added breakers become adequately dispersed throughout the fluid so that the fluid becomes fully degraded.

Retarded gel breakers have been developed which can be dispersed throughout the fluid prior to injecting it into the well. The delayed reaction of these retarded breakers allows the gelled fracture acidizing fluid to be pumped into the well with little effect on its viscosity. Once the fluid is in place, the viscosity of the fluid is gradually reduced. This releases the acid and facilitates the subsequent removal of the fluid from the formation. These retarded gel breakers are typically formed by coating or encapsulating particles of certain breaker materials so that the release of the breaker is delayed. There are problems with these gel breakers however. Often solvents used in the coating of these gel breakers leave the resulting particles sticky and moist so that the particles are difficult to handle and disperse within the fluid.

SUMMARY OF THE INVENTION

A particulate gel breaker for the controlled reduction in viscosity of an aqueous acid gel used in fracture acidizing a subterranean formation is provided for use with aqueous acid compositions which utilize a crosslinked polymer gel crosslinked with an organometallic compound. An amount of aqueous acid solution is dispersed throughout the gel for reacting with the treated formation. The gel breaker is formed of particles containing complexing materials selected from fluoride, phosphate, sulfate anions and multi-carboxylated compounds capable of complexing with the organometallic crosslinking compounds so that the linkages of the crosslinked polymer gel are broken. The particles are coated with a water insoluble wood resin which surrounds the particles and reduces the rate of release of the complexing materials. The release of the complexing materials gradually reduces the viscosity of the gel and releases the acid allowing it to react.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

The sole FIGURE is a graph showing the rate of fluoride release from fluorspar in an aqueous acid solution using uncoated and coated fluorspar of varying mesh sizes.

DETAILED DESCRIPTION OF THE PREFERRED EMBODIMENT

Viscous aqueous acid fluids used in fracture acidizing are typically formed from crosslinked polymer gels using organometallic complexes as the crosslinking agent. Well known crosslinking agents for use with polymer acid gels are those containing titanium or zirconium as the metal ion. These complexes are preferably zirconium or titanium compounds with polyfunctional organic acids. Examples of suitable crosslinkers include zirconium acetate, zirconium lactate, zirconium malate, zirconium citrate, titanium lactate, titanium malate, titanium citrate and the like.

Gel breakers used with these fluids are formed from materials capable of complexing with the organometallic crosslinkers. Materials that are known to complex with the titanium and zirconium crosslinkers include fluoride, phosphate, sulfate anions and multi-carboxylated compounds. Suitable materials containing fluoride which can be used as a gel breaker material include fluorspar, cryolite, fluorosilicates, fluoroborates and fluorophosphates. Because it is readily available, fluorspar, which is a naturally occurring source of calcium fluoride ($CaF_2$), is preferred. Phosphates include the alkali or alkaline earth phosphates. Suitable sulfate anions sources include the alkali or alkaline earth sulfates. The multi-carboxylated compounds include ethylene-diamine tetraacetic acid (EDTA) or its ammonium alkali or alkaline earth metal salt. Phosphonic acid and its salts can also complex with the organometallic crosslinkers. A suitable phosphonic acid is provided by diethylenetriamine pente (methylene phosphonic acid). These compounds are capable of complexing with the crosslinked polymer gel linkages so that the linkages are broken to thereby reduce the viscosity of the gel.

Due to the desirability of delaying the breaking or reduction of viscosity of the crosslinked polymer acid gels, these complexing materials are altered so that they are made less reactive when introduced into the gel. Fluorspar, for example, is usually available as very small fines which react readily when introduced into the crosslinked polymer gel. By coating the fluorspar with a water insoluble wood resin material, the fines are agglomerated to form a much larger particle size. The coating also controls the release of the fluoride from the fluorspar. This can be seen when comparing coated and uncoated fluorspar dispersed in an ungelled acid solution, as shown in the FIGURE. The release of fluoride would be slower in the presence of gelling agents.

A suitable resin material used in forming the coated particles of the invention is that sold as "VINSOL" resin available from Hercules, Inc., Willimgton, Del. This resin is essentially a mixture of high molecular weight phenolic compounds, resin acids and neutral materials. The resin is insoluble in both aliphatic hydrocarbons and water and is produced by extracting resinous pine wood with a coal tar hydrocarbon, removing the hydrocarbon by evaporation and leaving a residue comprising a mixture of wood rosin and the water insoluble resin. The resin is then separated from the wood rosin by extracting with a suitable petroleum hydrocarbon in which the wood rosin is soluble.

One method of forming the coated gel breaking particles includes mixing the resin with a suitable solvent, such as acetone and methanol, so that the resin is dissolved. The gel breaker is then added to the solution of resin and mixed so that the gel breaker material is thoroughly coated with resin solids. The solids of the coated gel breakers are then allowed to dry. The solvents used for dissolving the wood resin are mostly evaporated leaving the resulting coated particles generally dry, with no sticky or wet residue. This allows the particles to be easily poured and dispersed within the polymer gel. The amount of resin used to coat the particles should typically range between 10 to 80% by total weight of the particle, with 10 to 20% being preferred. The particles are sieved to provide a desired particle size. Larger particles may be broken up and resieved, while smaller particles may be reprocessed.

Other methods may also be used in coating the particles. For instance, the particles may be coated by forming a slurry of as previously described so that the gel breaker is coated with the resin. The slurry is then extruded through an orifice or orifices having a diameter substantially equal to that of the desired particle size. The extruded material is then dropped into a non-solvent, such as "ISOPAR L" available from Exxon Chemical Co., or other high boiling aliphatic hydrocarbon, which is heated to a temperature in excess of 150° F. The solvents are thus driven off to produce generally spherical resin coated gel breaking particles.

The following example illustrates a suitable formulation of the coated gel breaking particles using fluorspar as the gel breaker material.

EXAMPLE

Thirty pounds of Vinsol resin is added to a mixture of 3.5 gallons of methanol and 3.5 gallons of acetone. The resin is then mixed with the methanol/acetone mixture until the resin is dissolved. To this is added approximately 200 lbs of fluorspar having a 90% minimum as $CaF_2$ and 80 to 85% fines smaller than 200 mesh. The slurry is mixed for 10 to 20 minutes and then poured into drying containers where it is continuously worked to obtain a thorough distribution of coated solids. The solids are then allowed to completely dry. The resulting particles are then sieved to an appropriate particle size.

Different mesh sizes can be utilized when sieving the coated particles. Typically, a mesh size between 6 to 200 mesh will be used, with 8 to 40 mesh size being preferred. Coated fluorspar particles with smaller mesh sizes, i.e. greater than 40 mesh, tend to have an increased reaction rate than those of larger mesh sizes. Referring to the FIGURE, this may be due to the higher rate of fluoride release of the smaller sized particles. Table 1 gives a typical size distribution of particles sieved between 8 and 40 mesh.

TABLE 1

| PARTICLE SIZE DISTRIBUTION | |
|---|---|
| Sieve # | Percent by Weight |
| 10 | 0.30 |
| 20 | 79.68 |
| 25 | 11.21 |
| 30 | 2.90 |
| 35 | 4.00 |
| 40 | 1.50 |
| Pan | 0.40 |
|  | 100 |

In formulating the acid fracturing fluids, an aqueous acid solution is added to a polymer gel suitable for use in acid fracturing and having pendant groups for forming crosslink junctions with the organometallic crosslinkers. An example of suitable polymer is that formed by a mixture of polyacrylamide and acrylamidomethyl propane sulfonic acid (AMPS) or alkali metal salt thereof. Typically acid in the amount of between 3 to 28% by weight of the total composition is used. The coated particles are then added to this mixture and dispersed throughout. The amount of coated gel breaker can vary between about 0.02 to 1.0% by weight of the total acid gel composition with about 0.05 to 0.6% by weight being preferred. The crosslinking agent is then added in an amount of between about 0.04 to 0.1% by weight of the composition.

The following examples of Tables 2–7 further illustrate the use of the coated particles in various crosslinked acid gel systems using fluorspar as the gel breaker. The aqueous acid gel used in the examples was formulated from a high molecular weight anionic inverse emulsion polymer which consisted of a mixture of four parts polyacrylamide and one part AMPS or alkali metal salt thereof. Hydrochloric acid was used in varying amounts as the acid solution. Varying mesh sizes of resin coated fluorspar particles were added to the acid gel in an amount between about 15 to 30 pounds per thousand gallons (ppt) of the fluid. The gel was then crosslinked with a zirconium acetate crosslinking agent ("X-LINK").

In carrying out the tests, the gelled acid was allowed to hydrate over a 30 minute time period. The fluid was then split into portions to be used for the test and a control portion. With the exception of the 200° F. test, using 8 gallons per thousand (gpt) zirconium crosslinker, the control samples remained intact over the test period.

In some of the tests, a "BAROID FANN 35" viscometer with a R1B1 bob and cup was used to get a base fluid viscosity and a broken fluid viscosity. The viscosity of the base fluids at 70° F. ranged between 12 and 18 cps at 300 RPMS for a 15 gpt loading of the polymer emulsion. A viscosity between 14 and 25 cps was found for fluids having a polymer emulsion loading of 20 gallons gpt. In some tests, products were tested using a visual check to determine the crosslink nature of the fluid. The base crosslinked fluid typically had an initial viscosity of approximately 275 cps at a shear rate of 170 sec$^{-1}$. A "good lip" indicates that the fluid had sufficient viscosity to actually hang out of a bottle, looking like a tongue or lip. This normally correlates to a 270 to 280 cps viscosity. A fraction of the fluid having a somewhat crosslinked character, but unable to lip or degrade to a fluid with a viscosity less than or equal to the base gel acid fluid prior to crosslinking, indicates a broken status.

In some cases other additives were added to the fluids. These included the iron control additives "FE-271", "FE-270", "FE-300L" and "FE-700"; the nonemulsifier NE-18; and the fluid recovery agent "INFLO-100", all available from BJ Services Co. Coated gel breakers were also used in combination with uncoated gel breakers to inhibit initial crosslinking of the polymer gel.

TABLE 2

100° F. ATMOSPHERIC WATER BATH

| Test | Gel Breaker | Time | Results |
|---|---|---|---|
| 15% HCl w/15 gpt Polymer + 8 gpt "X-LINK" Base Fluid viscosity 15 cps at 300 RPM | 30 ppt 10–16 mesh particles | 4 hours <20 hours | Good Lip Broke <17 cps |

TABLE 3

115° F. ATMOSPHERIC WATER BATH

| Test | Gel Breaker | Time | Results |
|---|---|---|---|
| 15% HCl w/15 gpt Polymer + 8 gpt "X-LINK" | 25 ppt | 1 hour | Good Lip |
| | | 15 hours | No Lip. Fluid Degraded. 20–25% of Fluid at Base Fluid viscosity |
| | | 24 hours | Fluid degraded further 50–60% of Fluid now at Base Fluid Viscosity |
| 15% HCl w/15 gpt Polymer + 8 gpt "X-LINK" | 25 ppt | 1 hour | Good Lip |
| | | 15 hours | No Lip. Fluid Degraded. 20–25% of Fluid at Base Fluid viscosity |
| | | 24 hours | Fluid degraded |

TABLE 3-continued

115° F. ATMOSPHERIC WATER BATH

| Test | Gel Breaker | Time | Results |
|---|---|---|---|
| | | | further 50–60% of Fluid now at Base Fluid Viscosity |
| 15% HCl w/15 gpt Polymer + 8 gpt "X-LINK" | 25 ppt | 1 hour 15 hours | Good Lip No Lip. Fluid Degraded. 20–25% of Fluid at Base Fluid viscosity |
| | | 24 hours | Fluid Degraded further 50–60% of Fluid now at Base Fluid Viscosity |
| 15% HCl w/15 gpt Polymer + 8 gpt "X-LINK" | 25 ppt | 1 hour 15 hrs. 30 min. | Good Lip No Lip Fluid Degraded. 20–25% of Fluid at Base Fluid viscosity |
| | | 24 hours | Fluid Degraded further 50–60% of Fluid now at Base Fluid Viscosity |

TABLE 4

125° F. ATMOSPHERIC WATER BATH

| Test | Gel Breaker | Time | Results |
|---|---|---|---|
| 15% HCl w/15 gpt Polymer + 8 gpt "X-LINK." Base fluid viscosity 15 cps at 300 RPM | 30 ppt | 1 hour 18 hours | Good Lip Broke <5 cps |
| 15% HCl w/15 gpt Polymer + 8 gpt "X-LINK" | 25 ppt | 1 hour 18 hours | Good Lip No Lip. Fluid Degraded to Base Fluid Viscosity 15 cps at 300 RPM |
| 15% HCl w/15 gpt Polymer + 8 gpt "X-LINK" | 30 ppt | 1 hour 24 hours | Good Lip No Lip. Fluid Degraded to Base Fluid Viscosity 13 cps at 300 RPM |
| 15% HCl w/15 gpt Polymer + 8 gpt "X-LINK" | 30 ppt | 1 hour 24 hours | Good Lip No Lip. Fluid Degraded to Base Fluid Viscosity 13 cps at 300 RPM |

TABLE 5

140° F. ATMOSPHERIC WATER BATH

| Test | Gel Breaker | Time | Results |
|---|---|---|---|
| 15% HCl w/15 gpt Polymer + 8 gpt "X-LINK." Base Fluid viscosity 15 cps at 300 RPM | 30 ppt 10–16 mesh particles | 1 hrs 30 min 3 hours | Good Lip Broke <26 cps |

TABLE 5-continued

140° F. ATMOSPHERIC WATER BATH

| Test | Gel Breaker | Time | Results |
| --- | --- | --- | --- |
| 15% HCl w/15 gpt Polymer + 8 gpt "X-LINK." Base Fluid 15 cps @ 300 RPM and 70° F. | 30 ppt | 1 hrs 45 min 5 hours | Good Lip Weak Crosslink |
| 15% HCl w/15 gpt Polymer + 8 gpt "X-LINK" + 2 gpt Cl-23. Base Fluid 15 cps @ 300 RPM and 70° F. | 30 ppt | 1 hrs 45 min 5 hours | Good Lip Weak Crosslink |
| 20% HCl w/20 gpt Polymer + gpt "Cl-23" + 8 gpt "X-LINK" | None | 3 hrs 55 min | Fluid Crosslinked Good Lip |
| 20% HCl w/20 gpt Polymer + 2 gpt "Cl-23" + 8 gpt "X-LINK" | 20 ppt | 3 hrs 50 min | Fluid Crosslinked Good Lip |
| 20% HCl w/20 gpt Polymer + 2 gpt "Cl-23" + 8 gpt "X-LINK" + 2 gpt "FE-300L" | 20 ppt | 3 hrs 45 min | Fluid broke between 2 hrs 45 min and 3 hrs 45 min |
| 20% HCl w/20 gpt Polymer + 2 gpt "Cl-23" + 8 gpt "X-LINK" + 5 ppt "FE-700" + Calcium Carbonate Chips added 2 to 2.5 min after crosslinking | 20 ppt | 3 hrs 35 min | Fluid broke between 2 hrs 35 min and 3 hrs 35 min |
| 20% HCl w/20 gpt Polymer + 2 gpt "Cl-23" + 8 gpt "X-LINK" + 5 ppt "FE-700" + Calcium Carbonate Chips added 2 to 2.5 min after crosslinking | 20 ppt | 3 hrs 35 min | Fluid broke between 2 hrs 35 min and 3 hrs 35 min |
| 20% HCl w/20 gpt Polymer + 2 gpt "Cl-23" + 8 gpt "X-LINK" + 5 ppt "FE-700" + 2 gpt "FE-300L" + Calcium Carbonate Chips added 2 to 2.5 min after crosslinking | 20 ppt | 3 hrs 30 min | Fluid broke between 2 hrs 30 min and 3 hrs 30 min |
| 20% HCl W/20 gpt Polymer + 2 gpt "Cl-23" + 8 gpt "X-LINK" + 2 gpt "INFLO-100" | 20 ppt | 3 hrs 25 min | Fluid Crosslinked Good Lip |
| 20% HCl w/20 gpt Polymer + 2 gpt Cl-23" + 8 gpt "X-LINK" + 1 gpt "NE-18" | 20 ppt | 3 hrs 20 min | Fluid Crosslinked Good Lip |
| 20% HCl w/20 gpt Polymer + 2 gpt "Cl-23" + 8 gpt "X-LINK" + 1 gpt "NE-18" + 2 gpt "INFLO-100" | 20 ppt | 3 hrs 15 min | Fluid broke between 2 hrs 15 min and 3 hrs 15 min |
| 20% HCl w/20 gpt Polymer + 2 gpt "Cl-23" + 8 gpt "X-LINK" + 1 gpt "NE-18" + 2 pt "INFLO-100" + 5 ppt "FE-700" + Calcium Carbonate Chips added 2 to 2.5 min after crosslinking | 20 ppt | 3 hrs 10 min | Fluid Crosslinked Good Lip |
| 20% HCl w/20 gpt Polymer + 2 gpt "Cl-23" + 8 gpt "X-LINK" + 1 gpt "NE-18" + 2 gpt "INFLO-100" + 5 ppt "FE-700"+ 2 gpt "FE-300L" + Calcium Carbonate Chips added 2 to 2.5 min after crosslinking | 20 ppt | 3 hrs 5 min | Fluid broke between 2 hrs 5 min and 3 hrs 5 min |
| 15% HCl w/15 gpt polymer + 8 gpt | 25 ppt plus 10 ppt of uncoated EDTA Acid | 10 minutes | The fluid did not crosslink for 10 minutes |

TABLE 5-continued

140° F. ATMOSPHERIC WATER BATH

| Test | Gel Breaker | Time | Results |
|---|---|---|---|
| "X-LINK" | | 11 minutes | Very Good Lip |
| | | 8 hours | Degraded to base fluid very uniform break |
| 15% HCl w/15 gpt polymer + 8 gpt "X-LINK" | 25 ppt plus 2 gpt of diethylenetriamine pente (methylene phosphonic acid) | 10 minutes | The fluid did not crosslink |
| | | 1 hour | The fluid did not crosslink |
| | | 24 hours | The fluid did not crosslink |

TABLE 6

180° F. ATMOSPHERIC WATER BATH

| Test | Gel Breaker | Time | Results |
|---|---|---|---|
| 15% HCl w/15 gpt Polymer + 8 gpt "X-LINK." Base Fluid viscosity 15 cps at 300 RPM | 30 ppt 10–16 mesh particles | 1 hour | Good Lip |
| | | 2 hrs. 30 min. | Broke <19 cps |
| 15% HCl w/15 gpt Polymer + 8 gpt "X-LINK." Base Fluid 15 cps @ 300 RPM and 70° F. | 15 ppt | 4 hours | Broke <13 cps at 300 RPM |
| 15% HCl w/15 gpt Polymer + 8 gpt "X-LINK" + 2 gpt "Cl-23." Base Fluid 15 cps @ 300 RPM and 70° F. | 15 ppt | 4 hours | Good Lip |
| 15% HCl w/15 gpt Polymer + 8 gpt "X-LINK" + 2 gpt "Cl-23." Base Fluid 15 cps @ 300 RPM and 70° F. | 30 ppt | 4 hours | Broke <12 cps at 300 RPM |

TABLE 7

200° F. ATMOSPHERIC WATER BATH

| Test | Gel Breaker | Time | Results |
|---|---|---|---|
| 20% HCl w/20 gpt Polymer + 8 gpt "X-LINK"+ 5 gpt "FE-270" + 1 gpt "FE-271." Base Fluid viscosity 22 cps at 300 RPM | 10 ppt & 15 ppt | 45 minutes | All fluids syneresed and then broke |
| 20% HCl w/20 gpt Polymer + 6 gpt "X-LINK" + 5 gpt "Fe-270" + 1 gpt "FE-271." Base Fluid viscosity 22 cps at 300 RPM | 10 ppt | 2 hrs | Good Lip |
| | | 2 hrs 45 min | Broke <12 cps |
| | 15 ppt | 1 hrs 30 min | Good Lip |
| | | 2 hrs 15 min | Broke <12 cps |

The coated particulate gel breakers of the invention are easily formed without any sticky or wet residue so that they can be poured and dispersed readily within the polymer gel. The coated gel breaker allows the retarded release of gel breaking materials, such as fluoride from fluorspar, in aqueous acid fracturing fluids. Utilizing the aqueous acid fluids described, fluids may be injected into subterranean formations through the wellbore of an oil and gas well at high enough pressures to form fractures within the formation. The coated particles allow controlled or reduced rate of release of the complexing or gel breaking materials so that the organometallic compounds forming the linkages of the crosslinked polymer gel are broken. This reduces the fluid's viscosity for later removal of the fluid and releases the acid within the gel to react with the fracture faces of the formation.

While the invention is being shown in only one of its forms, it should be apparent to those skilled in the art that it is not so limited but is susceptible to various changes without departing from the scope of the invention.

We claim:

1. A method of acid fracturing a subterranean formation of an oil or gas well to stimulate production of hydrocarbons, the method comprising the steps of:

providing an aqueous acid fracturing fluid formed from a crosslinked polymer gel which is crosslinked with an organometallic compounds, the gel having an aqueous acid solution and gel breaker particles dispersed throughout, the particles containing complexing materials capable of complexing with the organometallic compounds of the polymer gel so that linkages of the crosslinked polymer gel are broken to thus reduce the viscosity of the gel, the particles having a coating of a water insoluble wood resin which reduces the rate of release of the complexing materials of the particles within the gel;

injecting the fracturing fluid into the formation at high pressure to form fractures within the formation; and allowing the complexing materials of the particles to be released to complex with the organometallic compounds so that the linkages of the crosslinked polymer gel are broken to reduce the viscosity of the gel.

2. The method of claim 1, wherein:

the amount of aqueous acid solution is between about 3 to 28% by weight of the composition.

3. The method of claim 1, wherein:

the amount of gel breaker is between about 0.02% to 1% by weight of the composition.

4. The method of claim 1, wherein:

the complexing material is fluoride.

5. The method of claim 4, wherein:

the fluoride is provided by fluorspar.

6. The method of claim 1, wherein:

the coated particles have a mesh size ranging from about 6 to 200 mesh.

7. The gel breaker of claim 1, wherein:

the coated particles have a mesh size ranging from about 8 to 40 mesh.

8. The method of claim 1, wherein:

the amount of coating is between about 10 to 80% by weight of the coated particle.

9. The method of claim 1, wherein:

the organometallic compounds contain zirconium or titanium.

10. The method of claim 1, wherein:

the complexing material is selected from a group consisting of fluoride, phosphate, sulfate anions and multicarboxylated compounds.

* * * * *

UNITED STATES PATENT AND TRADEMARK OFFICE
CERTIFICATE OF CORRECTION

PATENT NO.    :   5,497,830

DATED         :   March 12, 1996

INVENTOR(S)   :   Joel L. Boles, et al.

It is certified that error appears in the above-identified patent and that said Letters Patent is hereby corrected as shown below:

column 3, line 23, "Willimgton" should be --Wilmington--.

column 5, line 19, "NE-18" should be --"NE-18"--.

column 7, line 16, before "gpt" insert the number --2--.

column 9, line 51, "Fe-270" should be --"FE-270"--.

column 4, line 59 and ending with column 10, line 54, X-LINK appears throughout the text and tables with quotation marks as "X-LINK". It should be --X-LINK--. These quotation marks were unnecessarily added. Please remove the quotation marks in every instance.

Signed and Sealed this

Twelfth Day of August, 1997

*Attest:*

BRUCE LEHMAN

*Attesting Officer*     *Commissioner of Patents and Trademarks*